(12) United States Patent
Baba et al.

(10) Patent No.: US 7,556,754 B2
(45) Date of Patent: Jul. 7, 2009

(54) METHOD AND APPARATUS FOR GENERATING AN INJECTION SPEED PATTERN

(75) Inventors: Takato Baba, Numazu (JP); Masamitsu Suzuki, Numazu (JP); Motoyuki Miyauchi, Shizuoka-ken (JP); Hiroshi Katsuta, Gotenba (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 729 days.

(21) Appl. No.: 10/868,906

(22) Filed: Jun. 17, 2004

(65) Prior Publication Data

US 2004/0256755 A1 Dec. 23, 2004

(30) Foreign Application Priority Data

Jun. 17, 2003 (JP) .............................. 2003-172073
Apr. 26, 2004 (JP) .............................. 2004-129870

(51) Int. Cl.
*B29C 45/76* (2006.01)
*B29C 45/77* (2006.01)

(52) U.S. Cl. .................... 264/40.7; 264/40.4; 264/40.5; 264/328.1

(58) Field of Classification Search ........................ None
See application file for complete search history.

(56) References Cited

U.S. PATENT DOCUMENTS

| 5,178,805 | A | * | 1/1993 | Yokota | ...................... 264/40.1 |
| 5,835,379 | A | * | 11/1998 | Nakano | ...................... 700/197 |
| 6,365,075 | B1 | | 4/2002 | Kamiguchi et al. | |
| 6,835,337 | B2 | * | 12/2004 | Sasaki et al. | ............... 264/40.1 |

FOREIGN PATENT DOCUMENTS

| JP | 09-267374 | 10/1997 |
| JP | 2003-172073 | 6/2003 |
| JP | 2004-129870 | 4/2004 |

OTHER PUBLICATIONS

Office Action issued in U.S. Appl. No. 11/846,992 mailed Nov. 28, 2008.

* cited by examiner

*Primary Examiner*—Monica A Huson
(74) *Attorney, Agent, or Firm*—DLA Piper LLP US

(57) ABSTRACT

Shape information of a molded article is used to determine cross sectional information. Injection speed pattern data is generated based on parameter information such as the cross sectional area of a barrel cylinder, the filling time interval, the injection stroke, etc., and the generated cross sectional information. The injection speed pattern data is used to control the injection speed of the injection screw.

11 Claims, 7 Drawing Sheets

| Filling Time Interval [sec.] | Volumetric Capacity to Fill [mm$^3$] | Advancing Speed of Injection Screw [mm/sec.] | Changing Position of Injection Speed [mm] |
|---|---|---|---|
| 0-1 | $Q1 = \pi (50/2)^2 \times 16$ | $V_{S}1 = Q1/10^4 \pi = 1$ | ← 1 mm |
| 1-2 | $Q2 = \pi (50/2)^2 \times 14 + \pi (100/2)^2 \times 2$ | $V_{S}2 = Q2/10^4 \pi = 1.375$ | ← 2.375 mm |
| 2-3 | $Q3 = \pi (100/2)^2 \times 16$ | $V_{S}3 = Q3/10^4 \pi = 4$ | |
| 3-4 | $Q4 = \pi (100/2)^2 \times 16$ | $V_{S}4 = Q3/10^4 \pi = 4$ | |
| 4-5 | $Q6 = \pi (100/2)^2 \times 16$ | $V_{S}6 = Q3/10^4 \pi = 4$ | |

METHOD AND APPARATUS FOR GENERATING AN INJECTION SPEED PATTERN

This application is based on and derives the benefit of Japanese Patent Application No. 2003-172073, filed Jun. 17, 2003 and Japanese Patent Application No. 2004-129870, filed Apr. 26, 2004, the entire contents of both of which are incorporated herein by reference.

BACKGROUND

1. Field of the Invention

This invention relates generally to an injection molding method and apparatus, specifically to a method and apparatus for generating an injection speed pattern.

2. Description of the Related Art

In injection molding machines, the injection speed pattern, through which the speed an injection screw is controlled during an injection operation, depends greatly on the shape of a molded article.

In the conventional method, however, the following procedures are necessary to determine the injection speed pattern:

(A) defining a filling stroke of the injection screw in a barrel cylinder, determined by dividing the volumetric capacity of the molded article with the diameter of the barrel, (B) defining an injection speed in relation to the filling stroke through empirical knowledge, and then actually performing injection molding using the defined injection speed, (C) modifying various molding conditions in accordance with the article molded in (B), and (D) obtaining optimal molding conditions.

Accordingly, long-term experience and skill in the field of injection molding are required to determine the injection speed pattern of a given molded article.

FIG. 7 illustrates a cross sectional view of a pair of mold dies for molding a solid article with relatively simple shape.

As shown in FIG. 7, the mold dies MLD define a cavity CV which is filled with molten resin which then solidifies, thereby forming a molded article W.

The molten resin is supplied from a barrel BRL into the cavity CV through a nozzle NZ and a gate GT by means of an injection screw SCR.

The stroke of the injection screw SCR in the direction X of the injection screw axis is determined as indicated above, such that the volume of the resin in the barrel BRL after retracting the injection screw is equal to that of the molded article W, namely the capacity of the cavity CV.

Then, the molded article W is divided in the direction X into zones Z0, Z1, Z2, Z3, Z4 and Z5, where zone Z0 corresponds to gate GT. During injection, resin RS reaches zone Z1 from zone Z0, and in zone Z1, the moving speed of the injection screw SCR is so controlled to gradually increase the rate at which resin RS is supplied. A similar increasing of the rate at which resin is supplied is performed from zone Z2 to zone Z3. After zone Z3, the moving speed of the injection screw SCR is so controlled to gradually decrease the rate at which resin RS is supplied.

In contrast, in case of a cylindrical molded article Wa, shown in chained line in FIG. 7, the moving speed of the injection screw SCR is held constant from zone Z1 through zone Z5.

Thus, in general, the moving speed of the injection screw in a large cross-sectional area zone must be faster than that in a small cross-sectional area zone. This is the general understanding of the filling process.

However, even with such understanding, it is very difficult, particularly for an unskilled person, to determine both the series of injection speeds of the screw specifically as numerical values and the positions at which the injection speed should change. Consequently, many trials are necessary to improve the injection speed pattern.

Therefore, automatic injection speed pattern generation technology has been desired.

Automatic injection speed pattern generation technology is disclosed, for example, in Japanese laid open (unexamined) patent number 9-267374, which teaches that the shape of a molded article is resolved into micro elements and a numerical analysis method is applied to the micro elements. However, the numerical analysis method is disadvantageous in that it requires complex calculation.

SUMMARY OF THE INVENTION

The present invention is directed to an injection molding method in which an injection speed pattern of an injection screw is generated with respect to a shape of a molded article so that the speed of advancement of the front of molten resin in a cavity is constant during an injection molding operation, the cavity being formed in accordance with the molded article. The injection speed of the injection screw is controlled based on the generated injection speed pattern.

Further, the present invention is directed to a method of generating an injection speed pattern for an injection molding machine, through which an injection screw speed is controlled in accordance with a position of the screw in a barrel cylinder. The cross-sectional area information of a molded article is determined at each position in the direction in which the mold cavity fills, based on shape information for the molded article. Parametric information, including at least the cross-sectional area, the filling time interval, the length of the molded article in the direction in which the mold cavity fills, and the sectional amount of each of one or more zones along the length of the molded articles is prepared. The injection speed for each of the divided zones is determined based on the cross-sectional area information and the parametric information, and the determined injection speed is stored in a memory as control data corresponding to the divided zones.

Still further, the present invention is directed to an apparatus for generating an injection speed pattern data for an injection molding machine, through which an injection screw speed is controlled in accordance with a position of the screw in a barrel cylinder during an injection molding operation. A cross-sectional area information unit obtains the cross-sectional area of a molded article at each position in the direction in which the mold cavity fills based on the shape information of the molded article. A parameter setting unit sets parametric information including at least the cross-sectional area, the filling time interval, the length of the molded article in the direction in which the mold cavity fills, and the section amount of each of one or more zones along the length of the molded article. A processing unit determines the injection speed for each of the zones based on the cross-sectional area information and the parametric information. A memory unit stores the injection speed as control data for each of the zones.

BRIEF DESCRIPTION OF THE DRAWINGS

The foregoing and a better understanding of the present invention will become apparent from the following detailed description of several embodiments and the claims when read in connection with the accompanying drawings, all forming a part of the disclosure of the invention. While the foregoing and following written and illustrated disclosure focuses on disclosing several embodiments of the invention, it should be clearly understood that the same is by way of illustration and example only and is not to be taken by way of limitation.

DETAILED DESCRIPTION OF SEVERAL EMBODIMENTS

Figure 1:
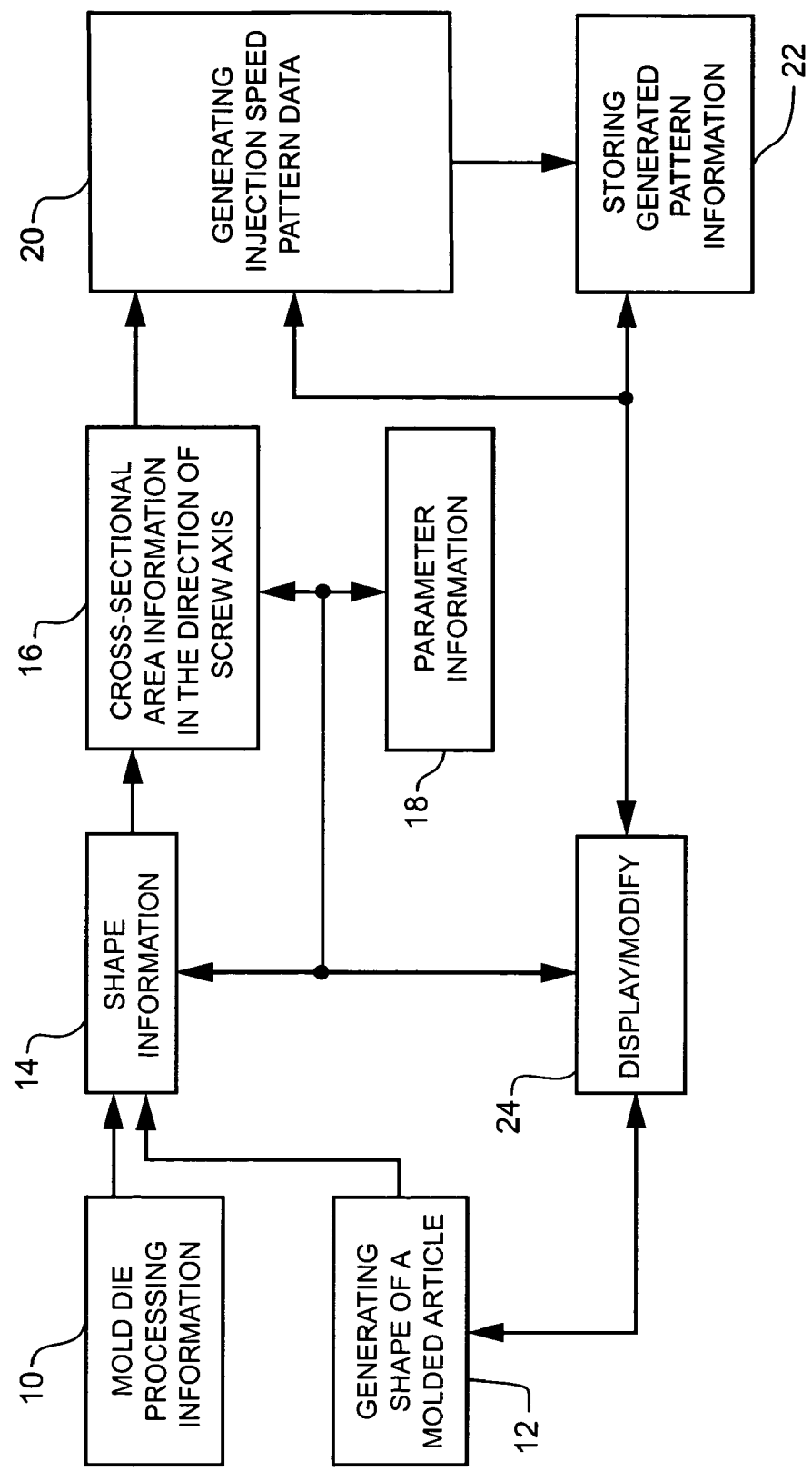
FIG. 1 is a conceptual block diagram providing a basic illustration of the generation process for injection speed pattern data according to an embodiment of the present invention.

Hereinafter, referring to FIGS. 1 to 6, several embodiments of the present invention will be explained in detail. In FIG. 1 reference numeral 10 designates providing mold die processing information given from a CAD (Computer Aided Design) device. Reference numeral 12 designates generating the shape of a molded article without depending on the mold die processing information. Reference numeral 14 designates generating shape information specified concerning the molded article determined based on information given from reference numerals 10 and 12. Reference numeral 16 designates generating cross-sectional area information in the direction (defined as X) in which the mold cavity fills from the shape-information of the molded article. Further, reference numeral 18 designates providing parametric information including the cross sectional area of a barrel cylinder, the filling time interval, the injection stroke, etc. Reference numeral 20 designates generating injection speed pattern data based on the cross-sectional area information 16 and the parametric information 18. Reference numeral 22 designates storing the result of step 20 in a memory. Furthermore, reference numeral 24 designates displaying and possibly modifying the results of reference numerals 12, 14, 16, 18 and 22.

In the generation of the shape of the molded article at 12, a plurality of primitive three dimensional graphic forms, such as circular cylinders, rectangular parallelepipeds, spheres, circular cones (frustum of circular cones), pyramids (frustum of pyramids) etc., can be displayed on a display at an operator's discretion. The operator can generate the shape information of the article with the aid of a computer by combining on a screen those graphic forms, synthesizing, processing, designating dimensions and defining the desired shape forming the article. Thus, the operator can generate the shape information of the article in advance without actually machining the mold dies for the purpose of simulation and evaluation of the injection speed pattern.

Figure 2:
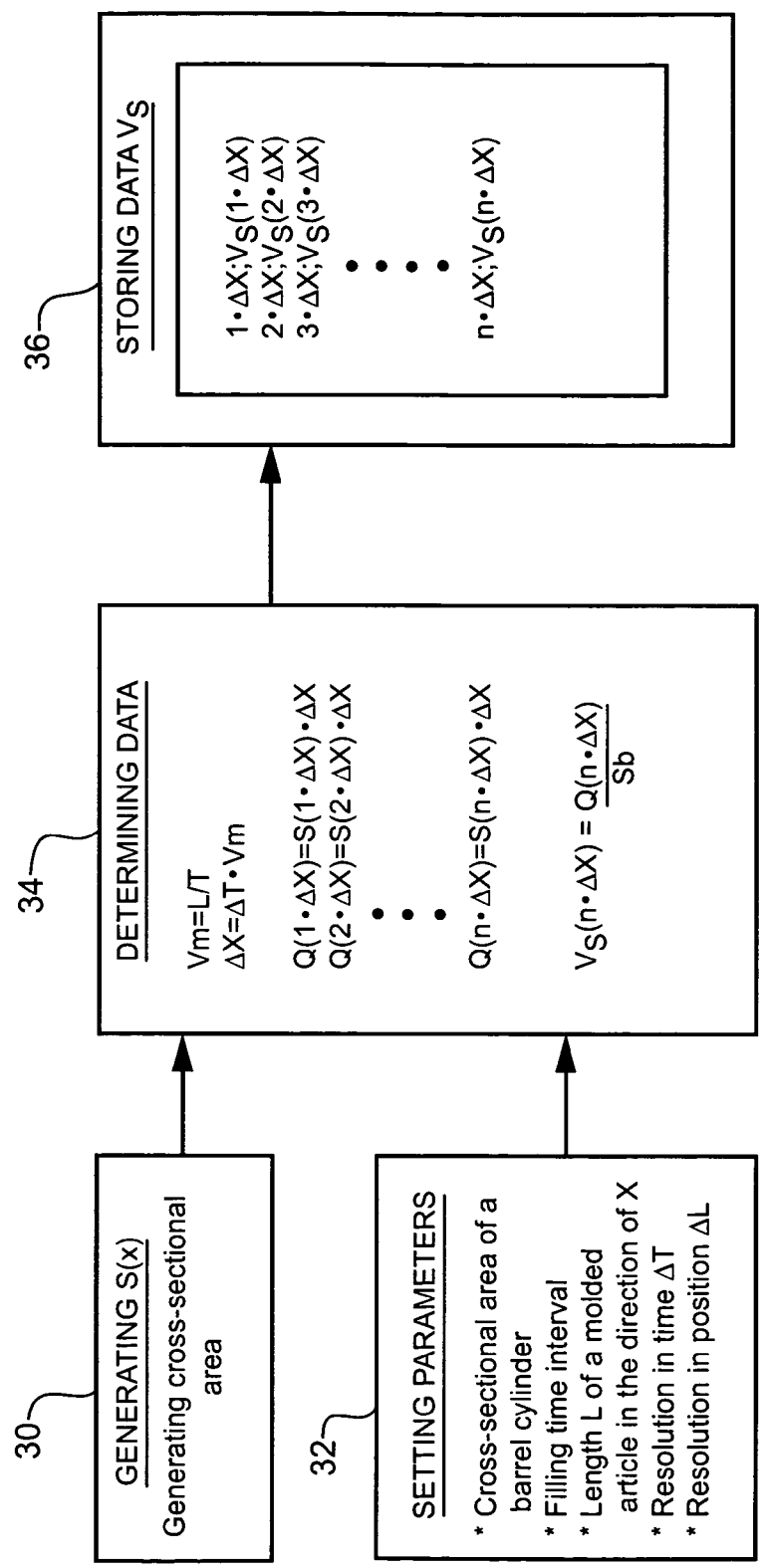
FIG. 2 is a functional block diagram providing further illustration of steps 16 to 22 in FIG. 1.

FIG. 2 is a functional block diagram providing further illustration of reference numerals 16 to 22 in FIG. 1. In FIG. 2 reference numeral 30 designates generating the cross sectional area $S(X)$ in the direction of the flow of the molten resin. The cross sectional area $S(X)$ is generated at 30 at a position X in the direction of the flow of molten resin as numerical data. The cross sectional area at the position X can alternatively be generated at 30 as a mathematical formula, namely the form of the function $S(X)$ on the variable X. Of course generating 30 can also be both. Reference numeral 32 designates the setting of parameters in which at least the cross-sectional area Sb of the barrel cylinder, the filling time interval T, the length L of the molded article in the direction of the flow of molten resin, and the sectional length of each of one or more zones along the length L are stored. The sectional length includes resolution values in time $\Delta T$ and/or resolution values in position $\Delta L$.

Reference numeral 34 designates processing which determines command values V of the moving speed to the injection screw in a given zone based on information and data supplied from the generating of cross-sectional area at 30 and the parameter setting at 32. In the processing at 34 the symbol Vm designates the moving speed of the advancement of the front of the resin flowing in the cavity of the mold dies during the injecting operation. The value Vm is a constant value determined from the length L of the molded article and the filling time interval T. Further, The symbol $\Delta X$ designates the moving distance which the front of the resin advances during the resolution in time $\Delta T$. Thus, $\Delta X$ designates the length of the zone in the direction of the flow of molten resin. The symbol $S(1 * \Delta X)$ designates the cross sectional area corresponding to the first zone 1 of the molded article, which is supplied from the generator 30 as numerical data. Further, in case of using the mathematical formula, such numerical data is calculated in advance as the values of the function $S(\Delta X)$ on the variable $\Delta X$.

The symbol $Q(1 * \Delta X)$ designates volumetric capacity of the molded article in the zone $\Delta X$, and is given as the product of the cross sectional area $S(1 * \Delta X)$ and the length of zone $\Delta X$. When the resolution in time $\Delta T$ is constant, the volumetric capacities corresponding to the next zone 2, and further "nth" zone are defined as $Q(2*\Delta X)$ and $Q(n*\Delta X)$, respectively. The symbol $VS(n*\Delta X)$ designates a speed command value of the moving speed to the injection screw in the "nth" zone, which is calculated from the capacity $Q(n*\Delta X)$ and the cross sectional area of the barrel Sb. Reference numeral 36 designates the storing of the speed command values in accordance with each of the zones in a memory.

Although $\Delta T$ has been described as being constant, $\Delta T$ can change along the length L of the molded article. In this case, $\Delta X$ also changes.($\Delta X=\Delta T * Vm$). Furthermore, instead of the resolution in time $\Delta T$ the resolution in position $\Delta X$ can be used directly, so that $\Delta X$ is also the zone length.

Although FIGS. 1 and 2 have been described as functional elements in a process flow, the elements in FIGS. 1 and 2 can also represent one or more hardware elements for performing the specific functions.

Figure 3:
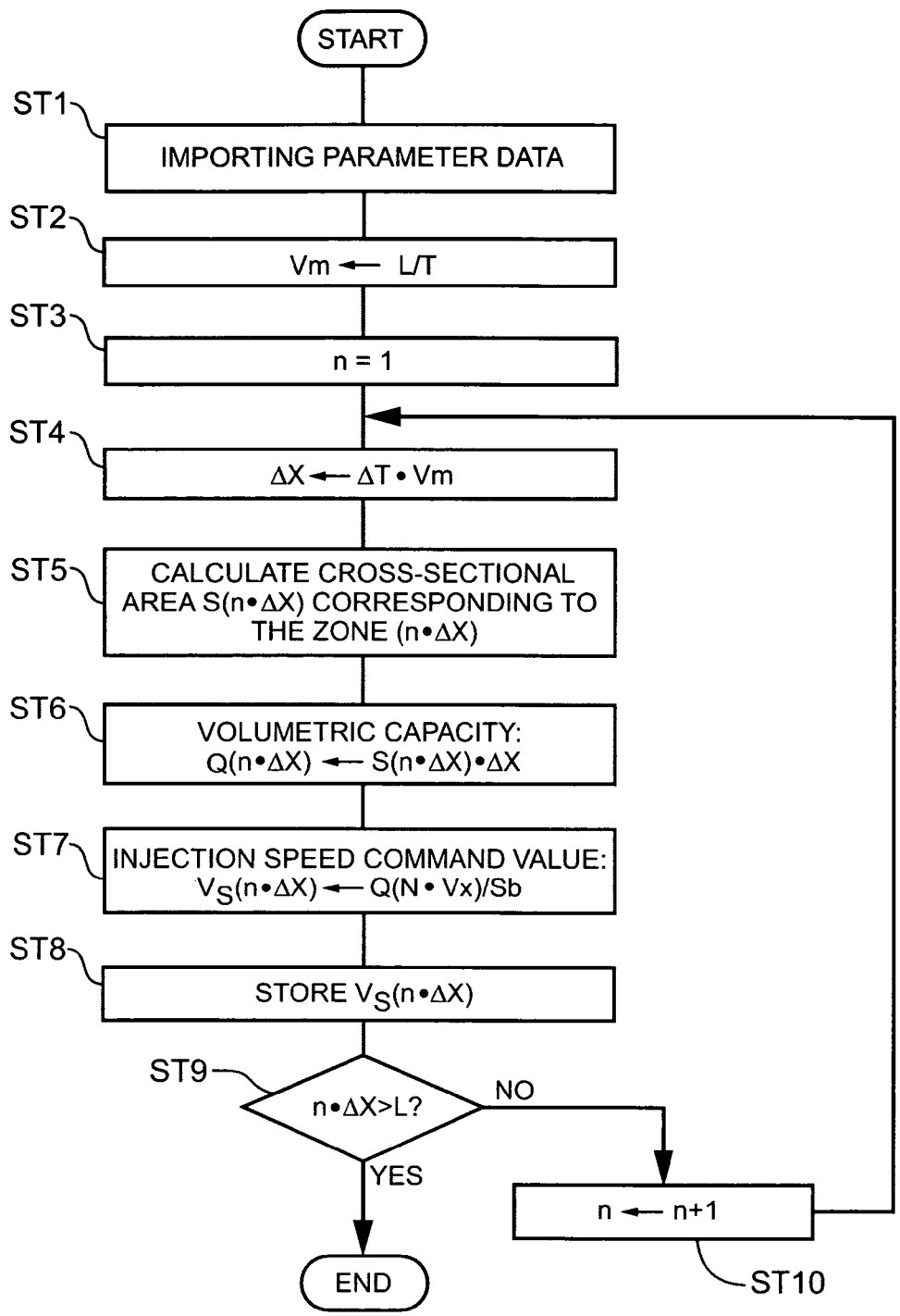
FIG. 3 is a flow chart of a procedure performed in processing unit 34.

FIG. 3 is a flow chart of a procedure performed by processing 34 in FIG. 2. In FIG. 3 when an operation command is given, the process starts, and at ST1, parametric data is imported. At ST2, Vm is calculated thereby defining the constant moving speed of the advancement of the front of the resin. Further, at ST3, the first zone 1 of the article is designated as n=1. Next, at ST4, the length $\Delta X$ is defined by the resolution in time $\Delta T$ and the constant speed Vm. Further, at ST5, the cross sectional area $S(n*\Delta X)$ is defined in accordance with the zone "n", wherein "n" designates a zone number. Then, at ST6, the volumetric capacity $Q(n*\Delta X)$ is defined in accordance with the zone "n", and at ST7 speed command value V(n*ΔX) of the moving speed to the injection screw in the zone "n" is determined. At step ST8 the determined speed command value is stored in the memory.

Furthermore, at ST9 it is judged whether or not all zones over the entire length L of the molded article have been processed. When the entire length has not been processed, at ST10 the value of "n" is incremented, and then steps ST4 to ST9 are repeated. When the entire length has been processed, the processing terminates.

The foregoing description of FIG. 2 does not refer to the gate portion as a zone. The reason is that the gate portion is assumed not to be a molded article itself, since it functions as a passage, providing sufficient resin supply in the given filling time interval. Thus, the gate portion does not necessarily function as a cross sectional area to which the constant speed Vm of the present invention is applied. However, the gate portion may be included as a zone of the molded article, such as when one set of mold dies has a plurality of cavities for articles (a so called multi-cavity-mold). Even with one cavity, the resin flow at a gate portion near a molded article influences resin flow at inner portions of the molded article.

In the foregoing description the parametric data is provided by the parameter setting 32. However, it is also possible to transfer or import the cross sectional area of the barrel Sb, the filling time interval T, the length L of the molded article, etc., from a controller of the injection molding machine. Furthermore, generating 30, parameter setting 32, processing 34 and storing 36 in FIG. 2 may be embedded in the controller as a part of it. Similarly, the steps 12, 14 and display and modifying 24 may be performed by the controller. Also, when one set of mold dies has a plurality of cavities for articles, the cross sectional area at a given zone is defined by summing up each of the cross sectional areas at the same zone.

Figure 4:
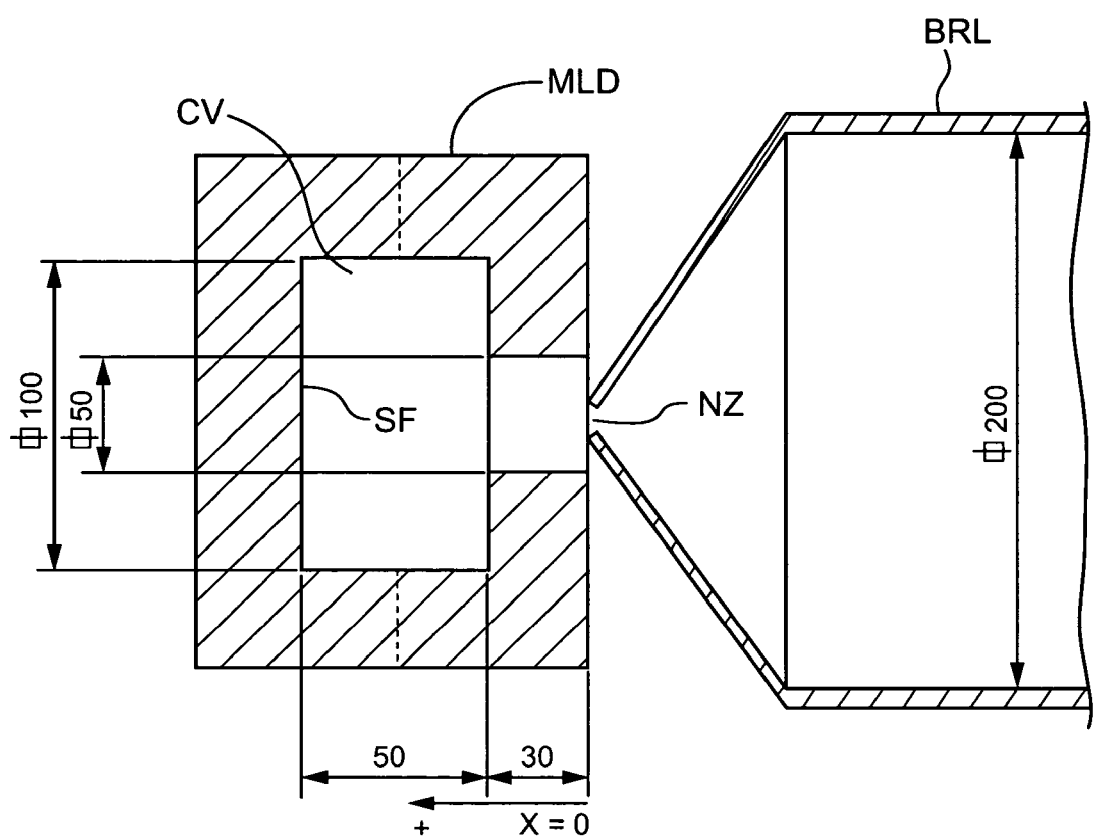
FIG. 4 is a cross-sectional view of a pair of mold dies showing the shape of a molded article to which a method of generating injection speed pattern data according to an embodiment of the invention is applied.
Figures 5A, 5B:
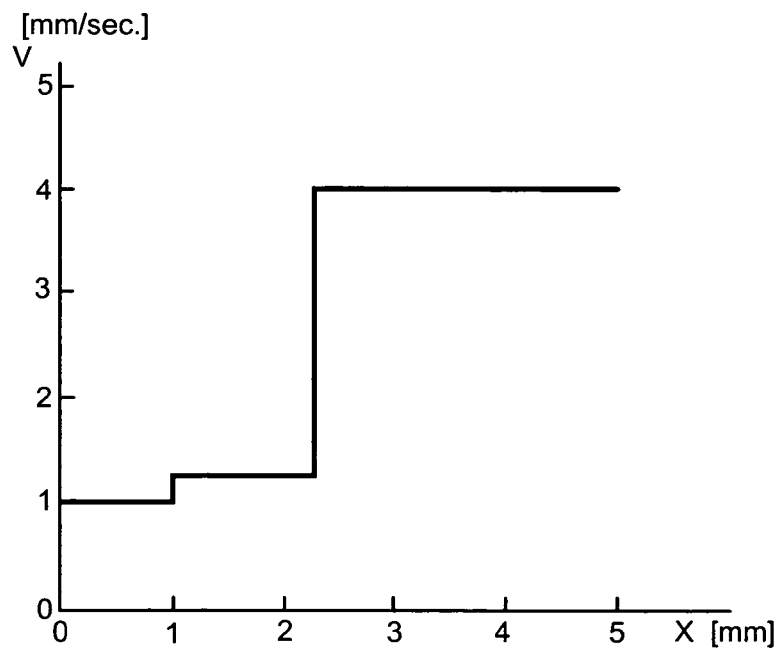
FIG. 5($a$) and FIG. 5($b$) show injection speed pattern data generated for the molded article shown in FIG. 4, wherein FIG. 5($a$) is a table showing data generated in one second increments, and FIG. 5($b$) is a graph showing the injection speed pattern corresponding to FIG. 5($a$).
Figure 6:
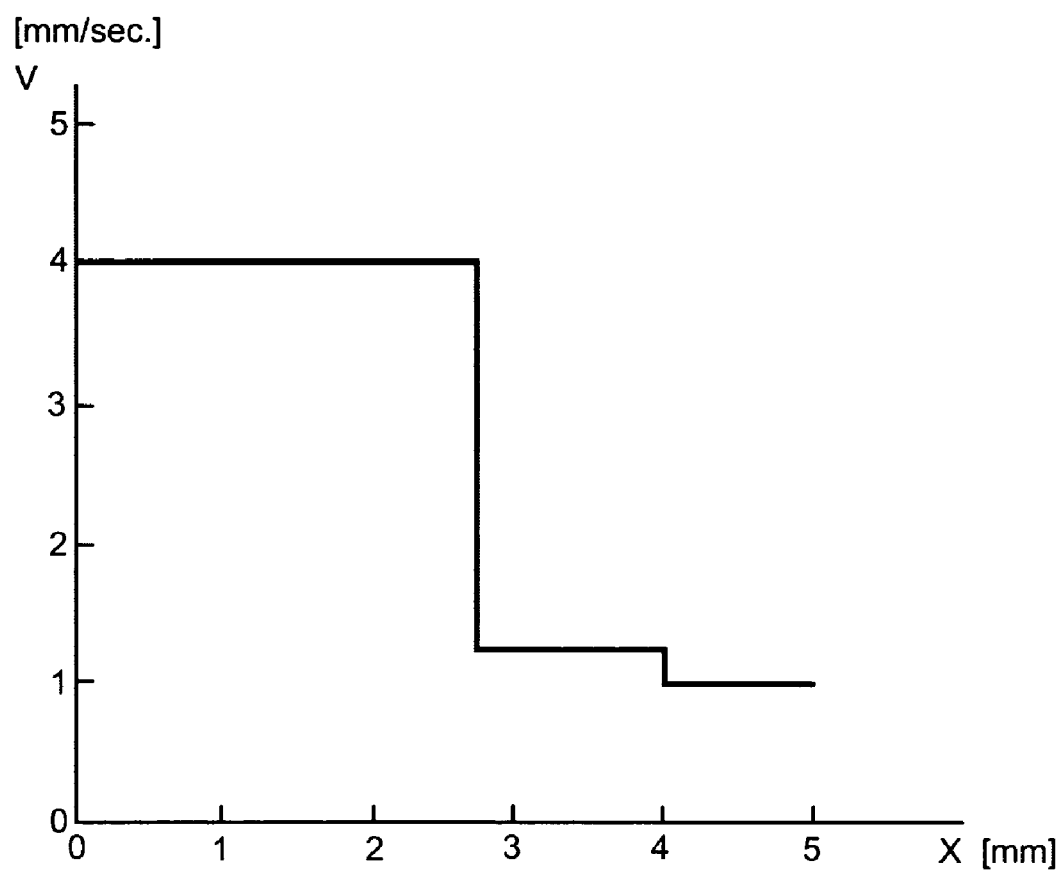
FIG. 6 is a graph showing an injection speed pattern in case that the molten resin advances in the opposite direction to that of FIG. 5($b$).
Figure 7:
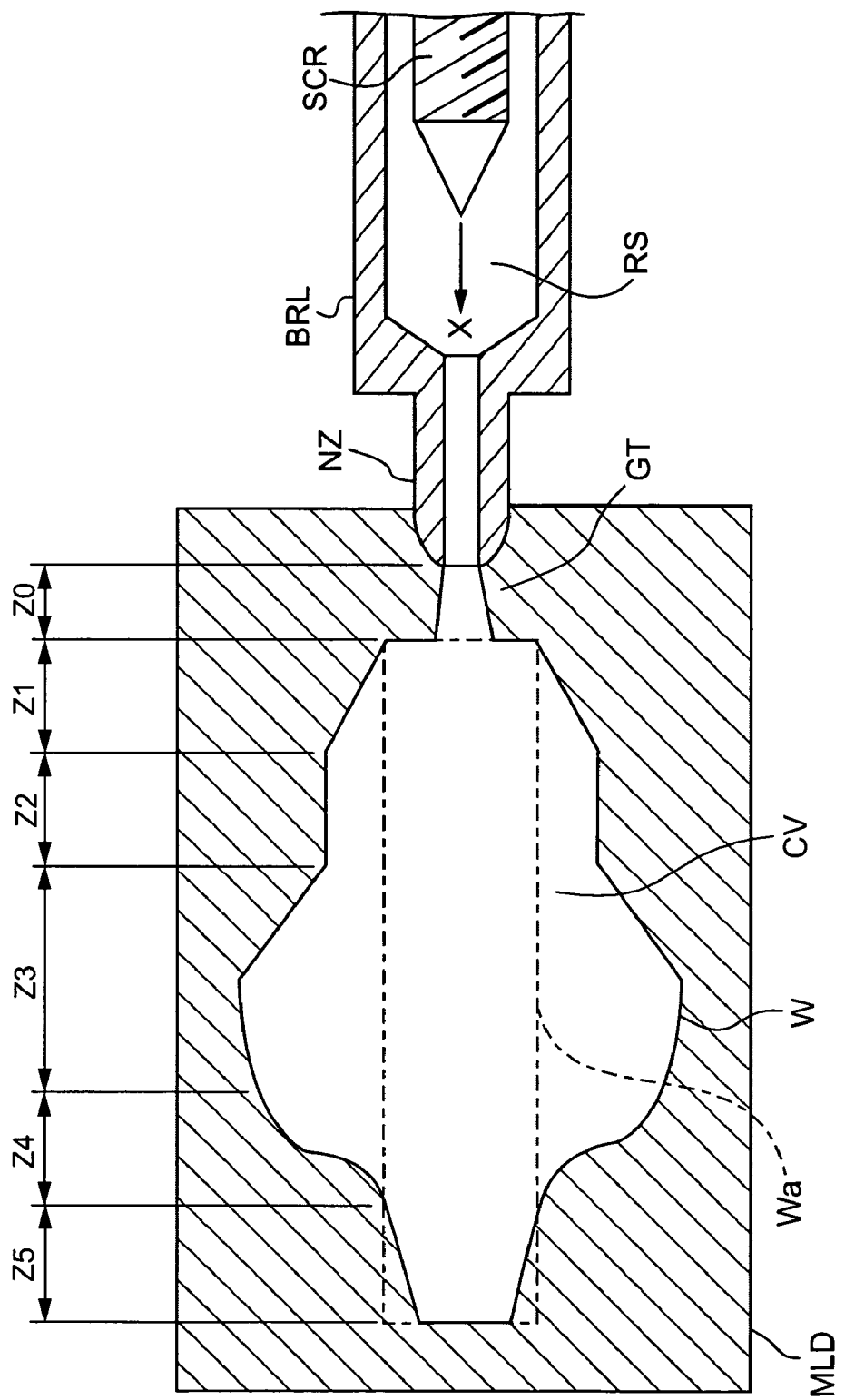
FIG. 7 is a cross-sectional view of a pair of mold dies for a solid molded article with a relatively simple shape.

FIGS. 4, 5, and 6 illustrate an example in which the generation of injection speed pattern data according to the present invention is employed. As shown in FIG. 4 a molded article formed in the cavity CV of the mold dies MLD is a cylindrical member with a step, having dimensions as illustrated in the drawing. On the right side of the mold dies MLD, a barrel BRL with an inner diameter of 200 mm and a nozzle NZ are shown with a simplified shape. Assuming that such a constituent molded article is injection molded in 5 seconds, the constant speed Vm of the advancement of the resin is 16 (mm/sec), determined from the length L(=80 mm) in the direction of resin flow and the filling time interval T(=5.0 sec). Furthermore, the cross sectional area of the barrel Sb is calculated as the following:

$$Sb = \pi(200/2)^2 = 10^4 \pi (mm^2)$$

Further, assume that resolution in time ΔT is 1 (sec). The speed command values for the injection screw are shown in a table in FIG. 5(a). In the time interval 1 to 2(sec) on the table the resolution in time ΔT (1 sec) extends across the discontinuity between the first 30 mm and the next 50 mm in FIG. 4, and therefore, the filling capacity Q is calculated separately. Having zones with discontinuities is avoidable through further dividing the resolution in time ΔT. FIG. 5(b) is a graph showing the injection speed pattern generated when each of the time intervals on the table in FIG. 5(a) is converted into stroke position in the direction X defined as the abscissa axis in the coordinate system, and the speed command values Vs to the injection screw are defined as the ordinate axis in the system.

The injection speed pattern is used to control the speed of the injection screw by the controller of the injection molding machine. Thus, the injection speed pattern with a constant resin speed is automatically generated by employing the shape information, the barrel dimensions, etc., which allows even an unskilled operator to operate the injection pattern control for molding the articles.

In the foregoing description the phrase "in the direction of the injection screw axis" means the direction of the injection screw when the same advances, namely the moving direction of the screw during injecting of the molten resin through the nozzle into the cavity. However, in the present invention the phrase can also include the opposite direction, namely the moving direction of the screw when the same retracts, as in a resin-measuring operation. The above illustrations in FIGS. 4, 5(a) and 5(b) are based on the assumption that the degree of viscosity of the molten resin is relatively high or the flow rate of the resin into the cavity is relatively small. Accordingly, the resin first fills a space with a diameter of 50 mm, then another adjacent space with a diameter of 100 mm (defined as a process CVP1), wherein the advancing direction in the cavity of the front of molten resin is the direction of +X.

However, different from the process CVP1, when the degree of viscosity of the molten resin is relatively low or the flow rate of the resin into the cavity is relatively large, the molten resin is injected through the nozzle NZ into the cavity and directly strikes the end surface SF of the cavity. Therefore, the resin first fills the space with the diameter of 100 mm, and then the adjacent space with the diameter of 50 mm (defined as a process CVP2), wherein the advancing direction in the cavity of the front of molten resin is reverse from the direction for process CVP1. Accordingly, the filling capacity, the screw's advancing speed and the injection speed changes, depending on the passage of time in the process CVP2 are reverse to those in the process CVP1. FIG. 6 illustrates the injection speed pattern in the process CVP2, corresponding to FIG. 5(b) in the process CVP1. It is noted however, that in FIG. 6 the position of the end surface SF in the large diameter portion is at X(=0).

The difference between the processes CVP1 and CVP2 lies in whether or not the filling of the cavity with molten resin is performed from a portion near the nozzle NZ to a portion far from the nozzle. The processes CVP1 and CVP2 are typical examples of the cavity filling process to be considered when the injection speed pattern generated by the present invention is employed. The advancing speed pattern of the injection screw can be easily defined by selecting either one of the processes CVP1 or CVP2. Further, it is preferable to combine the processes CVP1 and CVP2 with appropriate weighting, so that the molten resin flow, which depends greatly on the viscosity and the injection speed, approaches the actual flowing condition in the cavity.

The following modifications can be made to the embodiments disclosed above:

(1) Shape information for generating the cross-sectional area information can be supplied from a CAD device which holds information concerning the shape of the cavity.
(2) A plurality of primitive three dimensional graphic forms, such as a circular cylinder, a rectangular parallelepiped, a sphere, a circular cone (frustum of circular cone), a pyramid (frustum of pyramid), etc., can be displayed.
(3) The shape information of the article can be generated with the aid of a computer by combining those graphic forms on a screen, synthesizing, processing, designating dimensions and defining the desired shape forming the article.
(4) The injection speed pattern can be simulated and evaluated by generating the shape information of the article in advance without actual building the mold dies.
(5) The shape of the molded article can be displayed on a screen when the resin capacity necessary for molding the article is fixed. The display can then be operated so that the injection speed pattern is modified by modifying the displayed shape to produce improved results, even after the shape information of the article is supplied from a CAD system or the procedures on the screen using the primitive graphic forms.

(6) In the above case (5), the sectional amount for zones, namely resolution values, and the filling time interval can be modified besides the shape dimensions.

What is claimed is:

1. A method of injection molding, comprising:
   generating an injection speed pattern of an injection screw in a direction of its axis, the injection speed pattern causing the speed of the injection screw to change based on a change in the cross-sectional area of the cavity to cause an advancement of a frontal portion of a material being molded to have a constant moving speed Vm during a whole stroke of one injection molding operation; and
   controlling the injection speed of the injection screw based on the generated injection speed pattern.

2. A method of injection molding as in claim 1, wherein the generating further comprises:
   providing cross-sectional area information of a molded article for at least one position in a direction of advancement of the material being molded, the cross sectional area information being based on shape information of the molded article;
   preparing parametric information including at least cross-sectional area, filling time interval, length of the molded article in the direction of advancement of the material being molded, and a sectional amount of each of one or more zones along the length of the molded article;
   determining an injection speed corresponding to each of the zones based on the cross-sectional area information and the parametric information; and
   storing the injection speed in a memory as command data for the injection speed corresponding to the zones, wherein the controlling is based on a position of the injection screw in a barrel cylinder.

3. The method of injection molding as in claim 2, wherein said sectional amount is defined as values of resolution with respect to the filling time.

4. The method of injection molding as in claim 2, wherein said sectional amount is defined as values of resolution with respect to the screw position.

5. The method of injection molding as in claim 2, 3 or 4 wherein said providing of the cross-sectional area information of the molded article further includes:
   generating shape information of the molded article based on mold die processing information for forming a cavity corresponding to the molded article; and
   generating the cross-sectional area information of the molded article based on the shape information of the molded article from the generated shape information.

6. The method of injection molding as in any one of claims 2, 3, or 4 wherein said providing of the cross-sectional area information of the molded article further includes:
   generating a shape of the molded article using a plurality of primitive graphic forms programmed in advance;
   generating shape information of the molded article based on the shape of the generated molded article; and
   generating the cross-sectional area information of the molded article.

7. The method of injection molding as in any one of claims 2, 3, or 4 wherein said cross-sectional area information is defined as a cross-sectional area corresponding to each of the zones.

8. The method of injection molding as in any one of claims 2, 3, or 4 wherein said determining of the injection speed corresponding to each of the zones includes:
   importing the parametric information;
   defining a constant moving speed Vm of a front of material being molded based on the length L of the molded article in the direction of the movement of the material and the filling time interval T of the molded article in the parametric information;
   defining a zone length $\Delta X$ in the direction of movement of the material on the zone corresponding to the sectional amount and a constant moving speed Vm;
   defining a cross section area $S(\Delta X)$ corresponding to the zone length $\Delta X$;
   defining volumetric capacity of the molded article in the zone length $\Delta X$ based on the defined cross sectional area $S(\Delta X)$ and the zone length $\Delta X$;
   defining a moving speed $Vs(\Delta X)$ based on the defined volumetric capacity and a cross sectional area Sb of the barrel cylinder; and
   storing the defined moving speed $Vs(\Delta X)$ in the memory as speed command data for the injection screw.

9. A method of injection molding, comprising:
   generating an injection speed pattern of an injection screw in a direction of its axis, the injection speed pattern causing the speed of the injection screw to change based on a change in the cross-sectional area of the cavity to cause an advancement of a frontal portion of a material being molded to have a constant moving speed Vm during a whole stroke of one injection molding operation; and
   controlling the injection speed of the injection screw based on the generated injection speed pattern,
   wherein the generating of the injection speed pattern further comprises:
      providing cross-sectional area information of a molded article for at least one position in a direction of advancement of the material being molded, the cross-sectional area information being based on shape information of the molded article;
      preparing parametric information including at least cross-sectional area, filling time interval T, length L of the molded article in the direction of advancement of the material being molded, and a sectional amount of each of one or more zones along the length of the molded article;
      determining an injection speed corresponding to each of the zones based on the cross-sectional area information and the parametric information, wherein the cross-sectional area information is defined as a cross-sectional area corresponding to each of the zones; and
      storing the injection speed in a memory as command data for the injection speed corresponding to the zones, wherein the controlling of the injection speed of the injection screw is based on a position of the injection screw in a barrel cylinder,
   wherein the determining of the injection speed corresponding to each of the zones includes:
      importing the parametric information;
      defining the constant moving speed Vm of the frontal portion of the material being molded based on the length L of the molded article in the direction of the movement of the material and the filling time interval T of the molded article in the parametric information;

defining a zone length $\varDelta X$ in the direction of movement of the material on the zone corresponding to the sectional amount and the constant moving speed Vm;

defining a cross section area $S(\varDelta X)$ corresponding to the zone length $\varDelta X$;

defining volumetric capacity of the molded article in the zone length $\varDelta X$ based on the defined cross sectional area $S(\varDelta X)$ and the zone length $\varDelta X$;

defining a screw moving speed $Vs(\varDelta X)$ based on the defined volumetric capacity and a cross sectional area Sb of the barrel cylinder; and storing the defined moving speed $Vs(\varDelta X)$ in the memory as speed command data for the injection screw.

10. The method of injection molding as in claim 9 wherein said providing of the cross-sectional area information of the molded article further includes:

generating shape information of the molded article based on mold die processing information for forming a cavity corresponding to the molded article; and generating the cross-sectional area information of the molded article based on the shape information of the molded article from the generated shape information.

11. The method of injection molding as in claim 9 wherein said providing of the cross-sectional area information of the molded article further includes:

generating a shape of the molded article using a plurality of primitive graphic forms programmed in advance;

generating shape information of the molded article based on the shape of the generated molded article; and generating the cross-sectional area information of the molded article.

* * * * *